US012591541B1

(12) United States Patent
Marcus et al.

(10) Patent No.: US 12,591,541 B1
(45) Date of Patent: Mar. 31, 2026

(54) DYNAMIC FILE FORMATTING DURING A BULK DOWNLOAD WHEN INTERACTING WITH A DIGITAL PLATFORM

(71) Applicant: Bank of America Corporation, Charlotte, NC (US)

(72) Inventors: Denise M. Marcus, Charlotte, NC (US); Kristin E. Gemma, Brooklyn, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/934,421

(22) Filed: Nov. 1, 2024

(51) Int. Cl.
*G06F 16/11* (2019.01)

(52) U.S. Cl.
CPC ................................. *G06F 16/122* (2019.01)

(58) Field of Classification Search
None
See application file for complete search history.

(56) References Cited

U.S. PATENT DOCUMENTS

2014/0089826 A1* 3/2014 Boyd ................... G11B 27/031
715/765

* cited by examiner

*Primary Examiner* — Belix M Ortiz Ditren
(74) *Attorney, Agent, or Firm* — Weiss & Arons LLP

(57) ABSTRACT

A method for dynamic file formatting during a bulk download of files by interacting with a digital platform of an organization. The digital platform may include a software system that allows users to perform operations online. The digital platform may receive requests from a user portal by a logged on entitled user for a bulk download of files, for a change in name of twenty-five percent or more of the files, for a change in information within twenty-five percent or more of the files, and to provide the results of these requests to a non-entitled user. The digital platform may complete the requests from the user portal. The digital platform may provide the completed requests to the non-entitled user using an API push.

13 Claims, 5 Drawing Sheets

Figure 2:
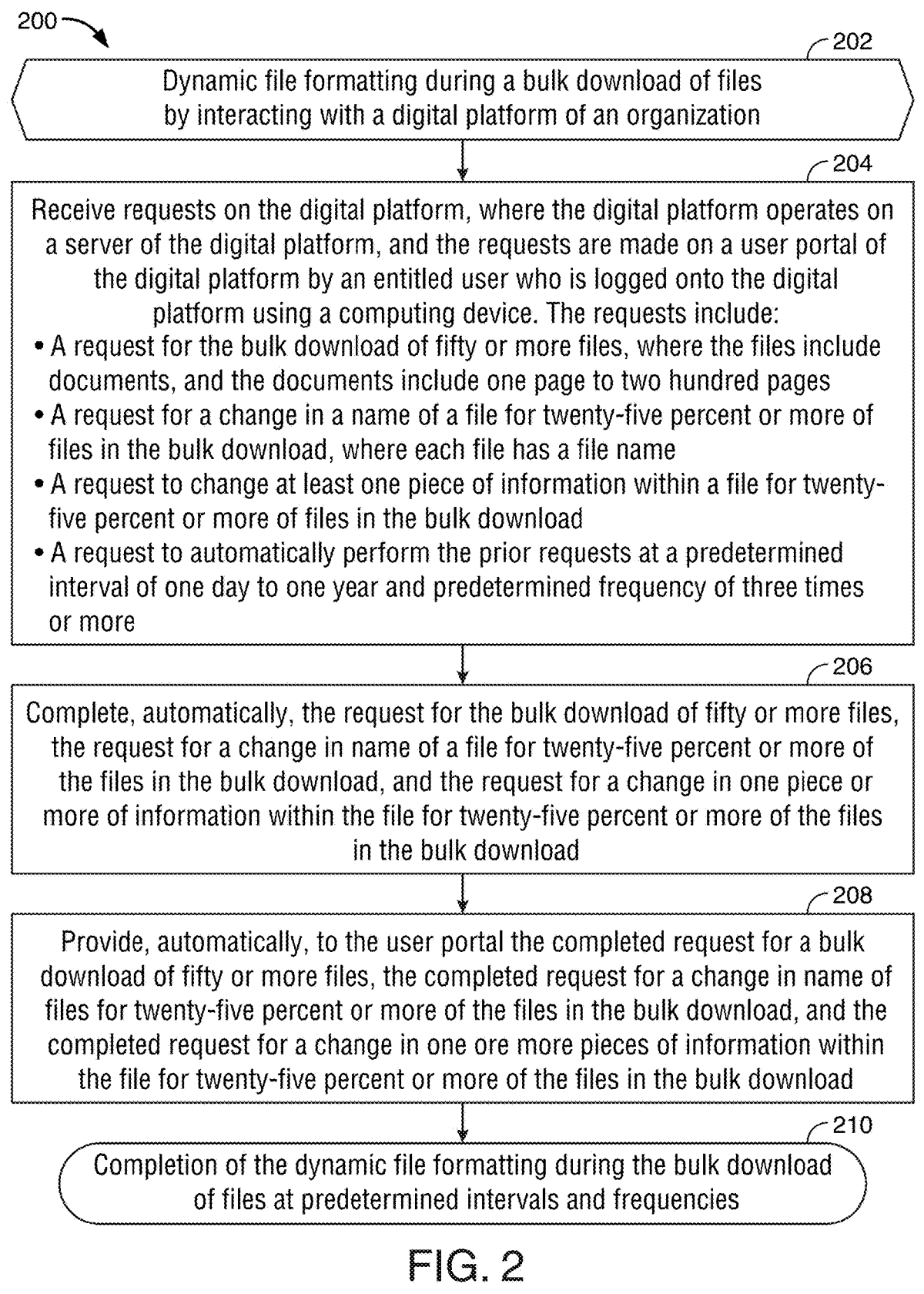

200 ⌐

202

Dynamic file formatting during a bulk download of files
by interacting with a digital platform of an organization

204

Receive requests on the digital platform, where the digital platform operates on
a server of the digital platform, and the requests are made on a user portal of
the digital platform by an entitled user who is logged onto the digital
platform using a computing device. The requests include:
• A request for the bulk download of fifty or more files, where the files include
documents, and the documents include one page to two hundred pages
• A request for a change in a name of a file for twenty-five percent or more of
files in the bulk download, where each file has a file name
• A request to change at least one piece of information within a file for twenty-
five percent or more of files in the bulk download
• A request to automatically perform the prior requests at a predetermined
interval of one day to one year and predetermined frequency of three times
or more

206

Complete, automatically, the request for the bulk download of fifty or more files,
the request for a change in name of a file for twenty-five percent or more of
the files in the bulk download, and the request for a change in one piece or
more of information within the file for twenty-five percent or more of the files
in the bulk download

208

Provide, automatically, to the user portal the completed request for a bulk
download of fifty or more files, the completed request for a change in name of
files for twenty-five percent or more of the files in the bulk download, and the
completed request for a change in one ore more pieces of information within
the file for twenty-five percent or more of the files in the bulk download

210

Completion of the dynamic file formatting during the bulk download
of files at predetermined intervals and frequencies

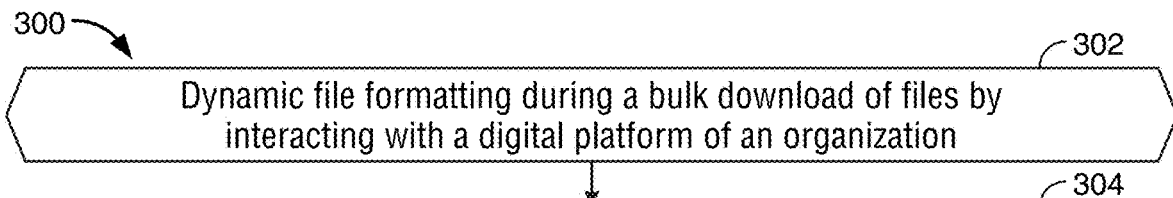

302

Dynamic file formatting during a bulk download of files by interacting with a digital platform of an organization

304

Receive requests on the digital platform, where the digital platform operates on a server of the digital platform, and the requests are made on a user portal of the digital platform by an entitled user who is logged onto the digital platform using a computing device. The requests include:
• A request for the bulk download of fifty or more files, where the files include documents, and the documents include one page to two hundred pages
• A request for a change in a name of a file for twenty-five percent or more of files in the bulk download, where each file has a file name
• A request to change one or more pieces of information within a file for twenty-five percent or more of files in the bulk download
• A request to provide the bulk download with the results from the request to change names of the files and the request to change information within the files to a user portal of a non-entitled user, where the non-entitled user is not entitled to receive the bulk download when initiating a request for the bulk download

306

Complete the request for the bulk download of fifty or more files, the request for a change in name of a file for twenty-five percent or more of the files in the bulk download, the request for a change in one ore more pieces of information within the file for twenty-five percent or more of the files in the bulk download, and the request to provide the bulk download with the results from the request to change names of files and the request to change information within the files to a user portal of a non-entitled user

308

Provide to the user portal of the non-entitled user using an application programming interface ("API") feed the completed bulk download of fifty or more files, the completed change in name of files for twenty-five percent or more of the files in the bulk download, the completed change in one or more pieces of information within the file for twenty-five percent or more of the files in the bulk download, and the request to provide the bulk download with the results from the request to change names of files and the request to change information within the files to a user portal of a non-entitled user

310

Completion of the dynamic file formatting during the bulk download of files at predetermined intervals and frequencies

FIG. 3

DYNAMIC FILE FORMATTING DURING A BULK DOWNLOAD WHEN INTERACTING WITH A DIGITAL PLATFORM

FIELD OF TECHNOLOGY

Aspects of the disclosure relate to dynamic file formatting when interacting with a digital platform.

BACKGROUND

Organizations may have a need for accessing files of various types. Sometimes, the organization may need to access a large quantity of files such as from a file storage location or server. The organization may seek a bulk download to obtain the files more efficiently. A bulk download may include a feature that allows a user to download multiple files at once instead of individually.

In some situations, there may be errors in the data contained in the files. These errors may be altered manually. In other situations, labelling conventions used for the files may be different than labelling conventions of the organization. The labelling may be changed manually.

The files may be obtained in an ad hoc manner, such as when they are needed. The files may be transferred by email to the party making the request for the bulk transfer.

SUMMARY

It may be an objective of the disclosure to provide systems and methods for correcting errors in the files included in a bulk download. It may be a further objective of the disclosure to provide systems and methods for labelling or relabeling the files in the bulk download, for example, to match a labelling convention used by the organization requesting the bulk download. It may be an additional objective of the disclosure to automatically initiate and/or process a bulk download that includes correcting errors in the files and labelling or relabeling the files.

It may be a further objective of the disclosure to provide higher security when transferring the bulk download. For example, an application programming interface ("API") push may be used to transfer the bulk download to a portal, such as a user portal, instead of email transfer. It may be another objective of the disclosure to provide for an entitled user to make a request for a bulk download to be provided to a user who is not entitled to request the bulk download.

Apparatus and processes may provide for dynamic file formatting during a bulk download of files. Apparatus and processes may include systems and methods for interacting with a digital platform of an organization.

The method may include dynamic file formatting during a bulk download of files. The method may include interacting with a digital platform of an organization. The digital platform may include a software system. The software system may allow users to perform operations online.

The digital platform of the organization may receive requests on a user portal. The digital platform may operate on a server of the digital platform. The digital platform may provide a user portal.

A user who is logged onto the digital platform may use a user portal. The user may have different levels of access to the digital platform based on their security clearance and entitlement granted by the organization. Before the digital platform grants the user's request, the digital platform may confirm that the user is entitled to access the information that would be provided when granting the request. The user may use a computing device to log onto the digital platform through the user portal.

The digital platform may receive a request for a bulk download of files. The files may each include one or more documents. The documents may include one to two hundred pages. The bulk download may include fifty or more files, two hundred or more files, five hundred or more files, or one thousand or more files.

The bulk download may include fifty to two thousand files, two hundred to two thousand files, five hundred to two thousand files, fifty to two thousand documents, two hundred to two thousand documents, or five hundred to two thousand documents.

The bulk download may include one hundred or more pages, one thousand or more pages, five thousand or more pages. The bulk download may include one hundred to fifty thousand pages, one thousand to fifty thousand pages, or five thousand to fifty thousand pages.

The digital platform may receive a request for a change in the name of a file. Each file in the bulk download may have a file name. Some files in the bulk download may have more than one file name. Each document in the file may have a file name. The request for a change in name may include changing the name of twenty-five percent or more of the files in the bulk download. The request for a change in name may include changing a name of fifty percent or more of the files in the bulk download. The request for a change in name may include changing the name of all or substantially all the files in the bulk download.

The digital platform may receive a request to change information within a file. The request may include changing one or more pieces of information within a file. Changing a piece of information within a file may be dictated by whether there are legal, regulatory, and/or other restrictions on the file. Some files in the bulk download may be restricted from changing information while others may not be restricted.

The request to change information within a file may include changing a piece of information with a file for twenty-five percent or more files in the bulk download, for fifty percent or more of files in the bulk download, or for substantially all the files in the bulk download.

The digital platform may receive a request to automatically perform the bulk download of files, to automatically change the name of files in the bulk download, and/or to automatically change information within a file in the bulk download. Automated action by the digital platform may contrast with ad hoc requests such as an ad hoc request to perform a bulk download, change the name of files in the bulk download, and/or change information within a file in the bulk download.

The digital platform may automatically perform the bulk download, change the name of files, and/or change information within a file at a predetermined interval and/or a predetermined frequency. The predetermined interval may include one day to one year or one week to three months. The predetermined interval may include one day, one week, one month, three months, or one year. The predetermined frequency may include three times or more, six times or more, twelve times or more, or thirty times or more.

The digital platform may automatically complete the bulk download of files, the change in names of the files in the bulk download, and/or the change in information in the files in the bulk download. The digital platform may automatically complete the bulk download of files, the change in names of the files in the bulk download, and/or the change in information in the files in the bulk download in ten minutes or less, in three minutes or less, in one minute or less, or in thirty seconds or less.

Twenty-five percent or more of the files may have their name changed and/or information within the file changed. Fifty percent or more of the files may have their name changed and/or information within the file changed. Seventy-five percent or more of the files may have their name changed and/or information within the file changed. Substantially all the files may have their name changed and/or information within the file changed.

The digital platform may automatically complete the performance of the bulk download, complete the change of the name of files, and/or complete the change of information within a file at a predetermined interval and/or a predetermined frequency. The predetermined interval may include one day to one year or one week to three months. The predetermined interval may include one day, one week, one month, three months, or one year. The predetermined frequency may include three times or more, six times or more, twelve times or more, or thirty times or more.

The digital platform may automatically provide the completed bulk download to the user portal. The digital platform may automatically provide the bulk download with the name of some, or all the files changed to the user portal. The digital platform may automatically provide the bulk download with the information in some, or all the files changed.

The method for dynamic file formatting may include changing the name of a file and/or changing one or more pieces of information within a file. The document may include a word processing document, a spreadsheet, an image file format, a presentation program, or a portable document format.

The bulk download may be provided to the user portal using an API push. An API push may provide the bulk download to the user portal more securely than other methods of providing the bulk download such as electronic mail.

The API push may include sending the bulk download to the user portal of the digital platform from a server of the digital platform. The bulk download may be accessible from the user portal when the user logs onto the portal. The terms push API and API push may be used interchangeably. The API push may allow the action of the server of the digital platform to be decoupled from the user being logged onto the user portal. The API push may have an advantage in that it provides reliable delivery to the user portal. The API push may send the bulk download encrypted to the user portal.

The digital platform may receive a request made on the user portal of the digital platform by the entitled user to provide the bulk download to a user portal of a non-entitled user. The non-entitled user may have an entitlement that does not allow the user to receive the bulk download when initiating a request for the bulk download. The digital platform may complete the request for the bulk download to be provided to the user portal of the non-entitled user when the entitled user makes the request from the user portal of the entitled user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative flowchart for receiving requests for a bulk download of files and for modifications to the files at a digital platform, and for automatically processing the requests in accordance with the principles of the disclosure;

FIG. 3 shows an illustrative flowchart for receiving requests for a bulk download of files and for modifications to the files at a digital platform and for processing the requests in accordance with the principles of the disclosure;

DETAILED DESCRIPTION

Figure 1:
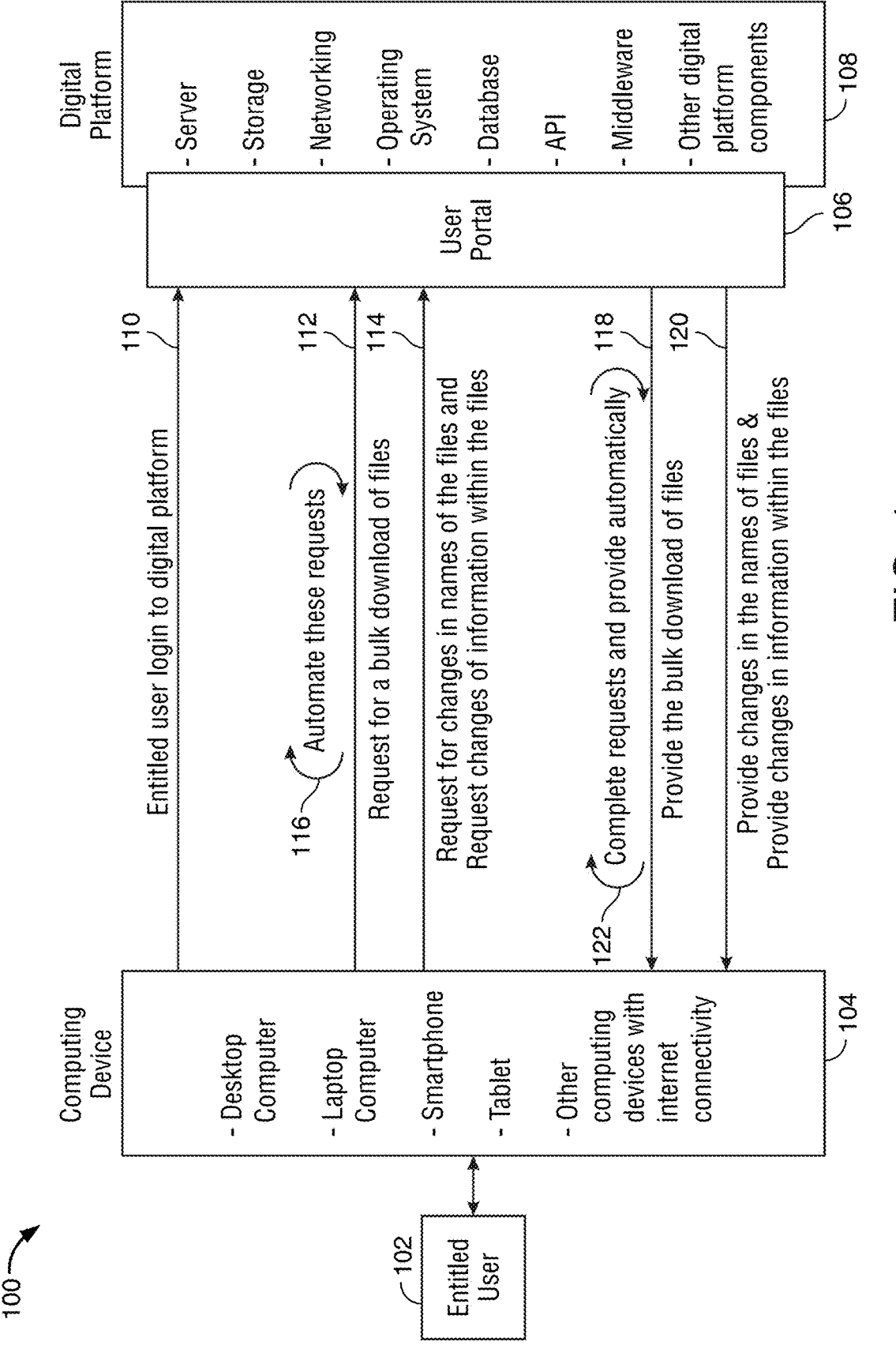
FIG. 1 shows an illustrative block diagram for receipt of requests for a bulk download of files and for modifications to the files at a digital platform, and for automatic processing of the requests in accordance with the principles of the disclosure.

Apparatus and processes may provide for dynamic file formatting during a bulk download of files. Apparatus and processes may include systems and methods for interacting with a digital platform of an organization.

The system for dynamic file formatting during a bulk download of files may include a digital platform of an organization. The digital platform may include a server, storage, networking, an operating system, a database, an API, middleware, a software system, and/or other digital platform components. The software system may allow users to perform operations online.

The digital platform of the organization may be configured to receive requests on a user portal. The digital platform may operate on a server of the digital platform. The digital platform may provide a user portal.

A user who is logged onto the digital platform may use a user portal. The user may have different levels of access to the digital platform based on their security clearance. Before the digital platform grants the user's request, the digital platform may confirm that the user is entitled to access the information that would be accessed when granting the request. The user may use a computing device to log onto the digital platform through the user portal.

The computing device may include a desktop computer, a portable version of a desktop computer such as a laptop computer, a mobile device such as a smartphone, a portable device with a touchscreen that may need internet to be fully functional such as a tablet, or any other computing device with internet connectivity.

The digital platform may be configured to receive a request for a bulk download of files. The files may each include one or more documents. The documents may include one to two hundred pages. The bulk download may include fifty or more files, two hundred or more files, five hundred or more files, or one thousand or more files. The bulk download may include fifty to two thousand files, two hundred to two thousand files, or five hundred to two thousand files.

The bulk download may include fifty or more documents, two hundred or more documents, five hundred or more documents, or one thousand or more fil documents es. The bulk download may include fifty to two thousand documents, two hundred to two thousand documents, or five hundred to two thousand documents. The bulk download may include one hundred or more pages, one thousand or more pages, five thousand or more pages. The bulk download may include one hundred to fifty thousand pages, one thousand to fifty thousand pages, or five thousand to fifty thousand pages.

The digital platform may be configured to receive a request for a change in the name of a file. Each file in the bulk download may have a file name. Some files in the bulk download may have more than one file name. Each document in the file may have a file name. The request for a change in name may include changing a name of twenty-five percent or more files in the bulk download, fifty percent or more of files in the bulk download, seventy-five percent or more of files in the bulk download, or substantially all the files in the bulk download. The request for a change in name may include changing a name of twenty-five percent or more of documents in the bulk download, fifty percent or more of documents in the bulk download, seventy-five percent or more of documents in the bulk download, or substantially all the documents in the bulk download.

The digital platform may be configured to receive a request to change information within a file and/or a document. The request may include changing one or more pieces of information within a file and/or a document. The request to change information within a file may include changing a piece of information within a file for twenty-five percent or more of files in the bulk download, fifty percent or more of files in the bulk download, seventy-five percent or more of files in the bulk download, or substantially all the files in the bulk download. The request to change information within a document may include changing a piece of information within a document for twenty-five percent or more documents in the bulk download, fifty percent or more of documents in the bulk download, seventy-five percent or more of documents in the bulk download, or substantially all the documents in the bulk download.

The digital platform may be configured to receive a request to automatically perform the bulk download of files. The digital platform may be configured to receive a request to automatically change the name of files in the bulk download. The digital platform may receive a request to automatically change information within a file in the bulk download. Automated action by the digital platform may contrast with ad hoc requests to perform a bulk download, to change the name of files in the bulk download, and/or to change information within the bulk download.

Dynamic file formatting may include changing the name of files in the bulk download. Each organization may have their own naming conventions. A digital platform that services multiple organizations may provide for customization of the naming of the files in the bulk download for a specific organization. The customized naming of files may be for substantially all files in the bulk download for that organization, or less than all files depending on the needs of the organization.

The digital platform may be configured to automatically complete the performance of the bulk download, complete the change of the name of files, and/or complete the change of information within a file at a predetermined interval and/or a predetermined frequency. The predetermined interval may include one day to one year or one week to three months. The predetermined interval may include one day, one week, one month, three months, or one year. The predetermined frequency may include three times or more, six times or more, twelve times or more, or thirty times or more.

The digital platform may be configured to automatically perform and/or complete the performance of the bulk download, the change of name of the files, and/or the change of information within a file in ten minutes or less, in three minutes or less, in one minute or less, or in thirty seconds or less. Twenty-five percent or more of the files, fifty percent or more of the files, seventy-five percent or more of the files, or substantially all the files may have their name changed and/or information within the file changed.

The digital platform may be configured to automatically perform and/or complete the performance of the bulk download, the change in name of the documents, and/or the change of information within a document in ten minutes or less, in three minutes or less, in one minute or less, or in thirty seconds or less. Twenty-five percent or more of the documents, fifty percent or more of the documents, seventy-five percent or more of the documents, or substantially all the documents may have their name changed and/or information within the file changed.

The digital platform may be configured to automatically complete the performance of the bulk download, complete the change in name of files, and/or complete the change of information within a file at a predetermined interval and/or a predetermined frequency. The predetermined interval may include one day to one year or one week to three months. The predetermined frequency may include three times or more, six times or more, twelve times or more, or thirty times or more.

The digital platform may be configured to automatically provide the completed bulk download to the user portal. The digital platform may automatically provide the bulk download with the name of some, or all the files changed to the user portal. The digital platform may automatically provide the bulk download with the information in some, or all the files changed.

The system for dynamic file formatting may include a change in the name of a file and/or a change in one or more pieces of information within a file.

The document may include a word processing document, a spreadsheet, an image file format, a presentation program, or a portable document format.

The bulk download may be provided to the user portal using an API push. An API push may provide the bulk download to the user portal more securely than other methods of providing the bulk download such as by electronic mail.

The API push may include sending the bulk download to the user portal of the digital platform from a server of the digital platform. The bulk download may be accessible from the user portal when the user logs onto the portal. The terms push API and API push may be used interchangeably. The API push may allow the action of the server of the digital platform to be decoupled from the user being logged onto the user portal. The API push may also have an advantage in that it provides reliable delivery to the user portal. Further, the API push may send the bulk download encrypted to the user portal.

The digital platform may receive a request made on the user portal of the digital platform by the entitled user to provide the bulk download to a user portal of a non-entitled user. The non-entitled user may have an entitlement that does not allow the user to receive the bulk download when initiating a request for the bulk download.

Implementations of the techniques described may include hardware, a method or process, or computer software on a computer-accessible medium.

The apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments, such as apparatus and/or methods, may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative block diagram 100. Block diagram 100 may be a system. The system may be configured to perform dynamic file formatting during a bulk download of files. The system may include a digital platform of an organization.

The system may include entitled user 102. Entitled user 102 may use computing device 104 to access a digital platform. Computing device 104 may include a desktop computer, a portable version of a desktop computer such as a laptop computer, a mobile device such as a smartphone, a portable device with a touchscreen that may need internet to be fully functional such as a tablet, or any other computing device with internet connectivity.

Entitled user 102 may use computing device 104 to log into digital platform 108 using user portal 106. The login may take place at 110. Digital platform 108 may include a server, storage, networking, an operating system, a database, an API, middleware, and/or other digital platform components. Digital platform 108 may use user portal 106 as a conduit to communicate with user devices such as computing device 104 of entitled user 102. User portal 106 may be part of digital platform 108. User portal 106 may be separate from digital platform 108. As pictured, user portal 106 may be part of digital platform 108.

Digital platform 108 may receive requests from computing device 104 through user portal 106. User portal 106 may receive a request for a bulk download of files at 112. User portal 106 may receive a request for changes in the names of the files at 114. User portal 106 may receive a request for changes of information within the files also at 114. User portal 106 may receive a request, at 116, to automate requests for a bulk download, for changes in the names of files, and/or for changes of information within the file.

Digital platform 108 may complete the requests received. Digital platform 108 may provide computing device 104, using user portal 106, the bulk download of files at 118. Digital platform 108 may provide computing device 104, using user portal 106, the changes in the names of files and/or the changes in information within the files at 120. User portal 106 may automatically complete a request, at 122, for a bulk download, for changes in the names of files, and/or for changes of information within the file.

FIG. 2 shows illustrative flowchart 200. Illustrative flowchart 200 may begin at step 202, showing a method for dynamic file formatting during a bulk download of files by interacting with a digital platform of an organization that includes the following steps.

The method may continue at step 204 by receiving requests on the digital platform, where the digital platform operates on a server of the digital platform, and the requests are made on a user portal of the digital platform by an entitled user who is logged onto the digital platform using a computing device. The requests may include a request for the bulk download of fifty or more files, where the files include documents, and the documents include one to two hundred pages. The bulk download may include five hundred or more files. The bulk download may include one thousand or more files.

The requests may include a request for a change in the name of a file for twenty-five percent or more of files in the bulk download, where each file has a file name. The requests may include a request to change one or more pieces of information within a file for twenty-five percent or more of files in the bulk download. The requests may include a request to automatically perform the prior requests at a predetermined interval of one day to one year and predetermined frequency of three times or more.

The method may continue at step 206 by completing, automatically, the request for the bulk download of fifty or more files, the request for a change in name of a file for twenty-five percent or more of the files in the bulk download, and/or the request for a change in one or more pieces of information within the file for twenty-five percent or more of the files in the bulk download.

The method may continue at step 208 by providing, automatically, to the user portal the completed request for the bulk download of fifty or more files, the completed request for a change in name of a file for twenty-five percent or more of the files in the bulk download, and/or the completed request for a change in one or more pieces of information within the file for twenty-five percent or more of the files in the bulk download.

The method may continue at step 210 with the completion of the dynamic file formatting during the bulk download of files at predetermined intervals and frequencies.

FIG. 3 shows illustrative flowchart 300. Illustrative flowchart 300 may begin at step 302, showing a method for dynamic file formatting during a bulk download of files by interacting with a digital platform of an organization that includes the following steps.

The method may continue at step 304 by receiving requests on the digital platform, where the digital platform operates on a server of the digital platform, and the requests are made on a user portal of the digital platform by an entitled user who is logged onto the digital platform using a computing device. The requests may include a request for the bulk download of fifty or more files, where the files include documents, and the documents include one to two hundred pages.

The requests may include a request for a change in the name of a file for twenty-five percent or more of files in the bulk download, where each file has a file name. The requests may include a request to change one or more pieces of information within a file for twenty-five percent or more of files in the bulk download. The requests may include a request to provide the bulk download with results from the request to change names of the files and the request to change information within the files to a user portal of a non-entitled user, where the non-entitled user is not entitled to receive the bulk download when initiating a request for the bulk download.

Sometimes an organization may want to relax credentials and allow receipt of a bulk download by a party not ordinarily entitled to receive such access. This allowance may still require a certain level of clearance and/or entitlement by the recipient; however, the level may be reduced from the level of clearance and/or entitlement ordinarily required for an entitled user to request and/or access the bulk download. Allowing such an arrangement may give entitled users flexibility in providing other members of the organization with access and/or knowledge necessary to perform certain functions or tasks. These functions or tasks may be of a limited nature thus not requiring the recipient to obtain a permanent level of entitlement. Also, becoming an entitled user may present a burden on the organization and/or the user. Reducing the number of members of the organization that are entitled to just those necessary may result in savings of time and money for the organization.

The method may continue at step 306 by completing the request for the bulk download of fifty or more files, the request for a change in name of a file for twenty-five percent or more of the files in the bulk download, the request for a change in one or more pieces of information within the file for twenty-five percent or more of the files in the bulk download, and the request to provide the bulk download with the results from the request to change names of files and the request to change information within the files to a user portal of a non-entitled user.

The method may continue at step 308 by providing to the user portal of the non-entitled user using an API push the completed request for the bulk download of fifty or more files, the completed request for a change in name of a file for twenty-five percent or more of the files in the bulk download, the completed request for a change in one or more pieces of information within the file for twenty-five percent or more of the files in the bulk download, and the request to provide the bulk download with the results from the request to change names of files and the request to change information within the files to a user portal of a non-entitled user.

The method may continue at step 310 with the completion of the dynamic file formatting during the bulk download of files at predetermined intervals and frequencies.

Figure 4:
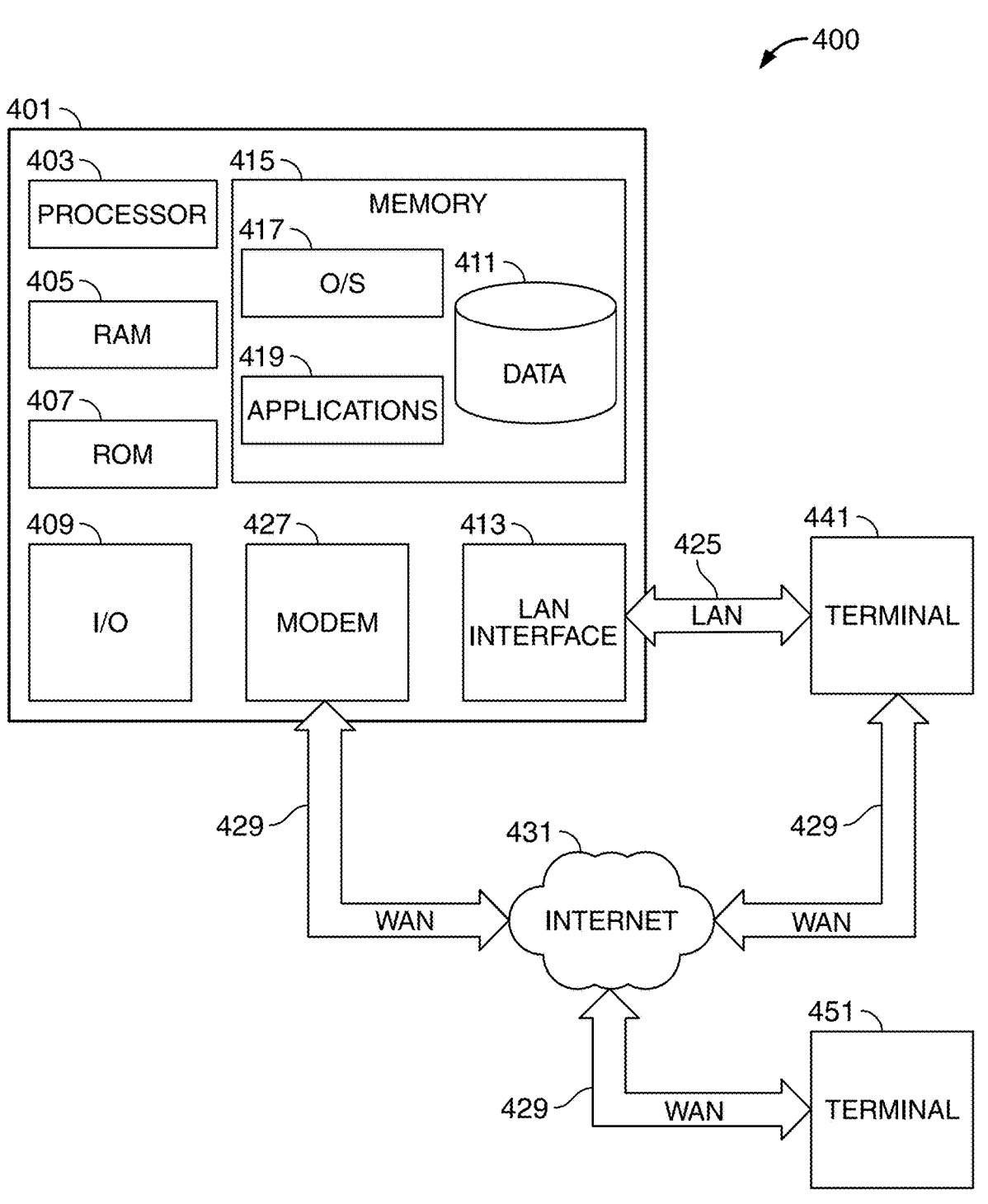
FIG. 4 shows an illustrative block diagram in accordance with principles of the disclosure.

FIG. 4 shows an illustrative block diagram of system 400 that includes computer 401. Computer 401 may alternatively be referred to herein as an "engine," "server" or a "computing device." Computer 401 may be a workstation, desktop, laptop, tablet, smartphone, or any other suitable computing device. Elements of system 400, including computer 401, may be used to implement various aspects of the systems and methods disclosed herein. Each of the systems, methods and algorithms illustrated below may include some or all the elements and apparatus of system 400.

Computer 401 may have a processor 403, including a central processing unit ("CPU"), for controlling the operation of the device and its associated components, and may include RAM 405, ROM 407, input/output ("I/O") 409, and a non-transitory or non-volatile memory 415. Machine-readable memory may be configured to store information in machine-readable data structures. Processor 403 may also execute all software running on the computer. Other components, such as graphics processing unit ("GPU"), EEPROM, Flash memory, neural-network processing elements, or any other suitable components, may also be part of the computer 401.

Memory 415 may be comprised of any suitable permanent storage technology—e.g., a hard drive. Memory 415 may store software including the operating system 417 and application program(s) 419 along with any data 411 needed for the operation of the system 400. Memory 415 may also store videos, text, and/or audio assistance files. The data stored in memory 415 may also be stored in cache memory, or any other suitable memory.

I/O module 409 may include connectivity to a microphone, keyboard, touch screen, mouse, and/or stylus through which input may be provided into computer 401. The input may include input relating to cursor movement. The input/output module may also include one or more speakers for providing audio output and a video display device for providing textual, audio, audiovisual, and/or graphical output. The input and output may be related to computer application functionality.

System 400 may be connected to other systems via a local area network interface 413. System 400 may operate in a networked environment supporting connections to one or more remote computers, such as terminals 441 and 451. Terminals 441 and 451 may be personal computers or servers that include many, or all the elements described above relative to system 400. The network connections depicted in FIG. 4 include a local area network ("LAN") 425 and a wide area network ("WAN") 429 but may also include other networks. When used in a LAN networking environment, computer 401 is connected to LAN 425 through LAN interface 413 or an adapter. When used in a WAN networking environment, computer 401 may include a modem 427 or other means for establishing communications over WAN 429, such as Internet 431.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or an API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 419, which may be used by computer 401, may include computer executable instructions for invoking functionality related to communication, such as e-mail, Short Message Service ("SMS"), and voice input and speech recognition applications. Application program(s) 419 (which may be alternatively referred to herein as "plugins," "applications," or "apps") may include computer executable instructions for invoking functionality related to performing various tasks. Application program(s) 419 may utilize one or more algorithms that process received executable instructions, perform power management routines or other suitable tasks.

Application program(s) 419 may include computer executable instructions (alternatively referred to as "programs"). The computer executable instructions may be embodied in hardware or firmware (not shown). Computer 401 may execute the instructions embodied by the application program(s) 419 to perform various functions.

Application program(s) 419 may utilize the computer-executable instructions executed by a processor. Programs may include routines, programs, objects, components, data structures, etc., that perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 411, and any other suitable information, may be stored in memory 415.

The disclosure may be described in the context of computer-executable instructions, such as application(s) 419, being executed by a computer. Programs may include routines, programs, objects, components, data structures, etc., that perform tasks or implement data types. The disclosure may also be practiced in distributed computing environments. Tasks may be performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 401 and/or terminals 441 and 451 may also include various other components, such as a battery, speaker, and/or antennas (not shown). Components of computer system 401 may be linked by a system bus, wirelessly or by other suitable interconnections. Components of computer system 401 may be present on one or more circuit boards. In some embodiments, the components may be integrated into a single chip. The chip may be silicon-based.

Terminal 441 and/or terminal 451 may be portable devices such as a laptop, cell phone, tablet, smartphone, or any other computing system for receiving, storing, transmitting, and/or displaying relevant information. Terminal 441 and/or terminal 451 may be one or more user devices. Terminals 441 and 451 may be identical to system 400 or different. Differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 5:
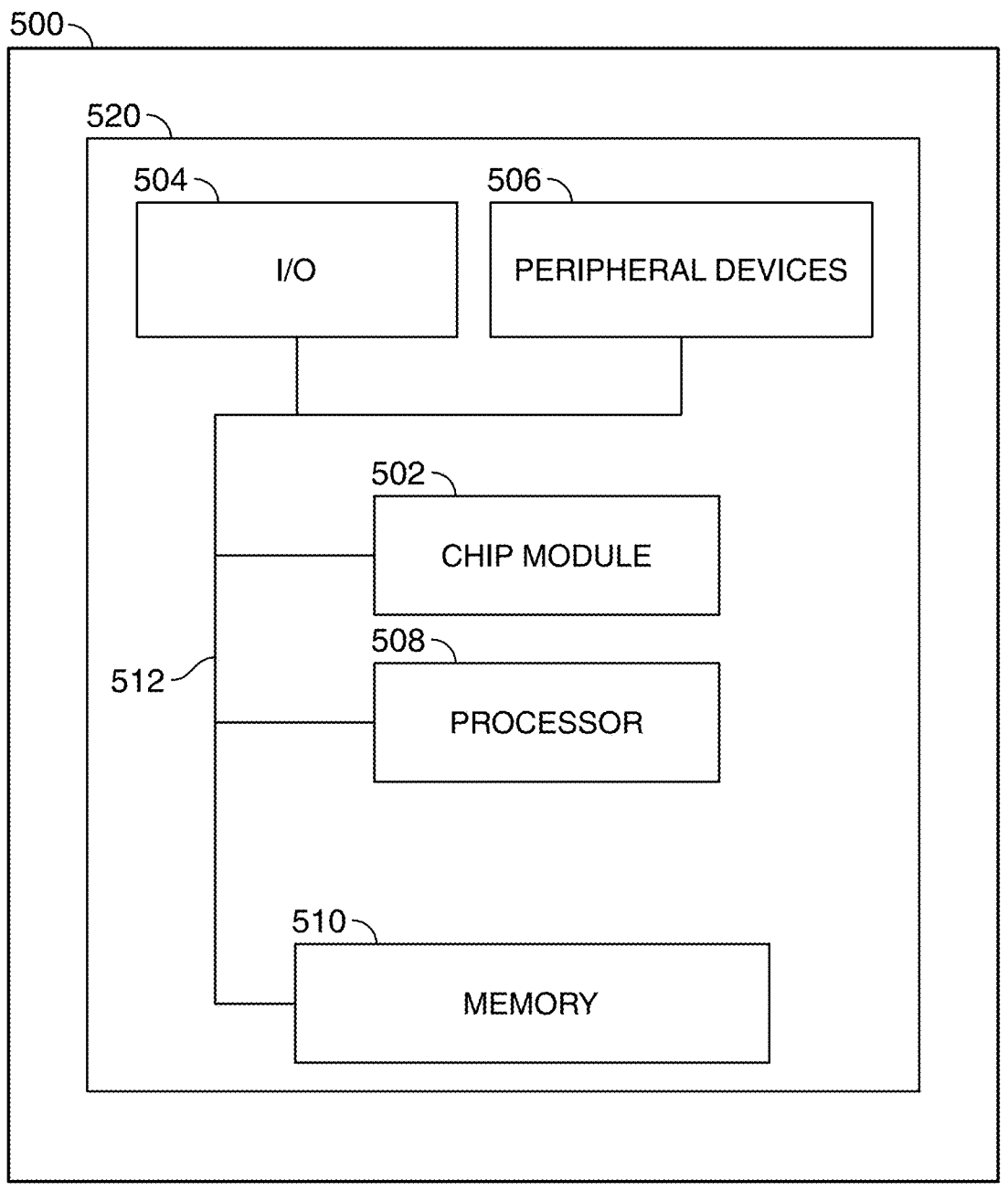
FIG. 5 shows an illustrative block diagram in accordance with principles of the disclosure.

FIG. 5 shows an illustrative apparatus 500 that may be configured in accordance with the principles of the disclosure. Apparatus 500 may be a computing device. Apparatus 500 may include one or more features of the apparatus shown in FIG. 5. Apparatus 500 may include chip module 502, that may include one or more integrated circuits, and that may include logic configured to perform any other suitable logical operations.

Apparatus 500 may include one or more of the following components: I/O circuitry 504, that may include a transmitter device and a receiver device and may interface with fiber optic cable, coaxial cable, telephone lines, wireless devices, PHY layer hardware, a keypad/display control device or any other suitable media or devices; peripheral devices 506, that may include counter timers, real-time timers, power-on reset generators or any other suitable peripheral devices; logical processing device 508, that may compute data structural information and structural parameters of the data; and machine-readable memory 510.

Machine-readable memory 510 may be configured to store in machine-readable data structures: machine executable instructions, (which may be alternatively referred to herein as "computer instructions" or "computer code"), applications such as applications 419 (shown in FIG. 4), signals, and/or any other suitable information or data structures.

A system bus or other interconnections 512 may couple components 502, 504, 506, 508 and 510 and may be present on one or more circuit boards such as circuit board 520. In some embodiments, a single chip may integrate the components. The chip may be silicon-based.

Thus, provided may be systems and methods relating to dynamic file formatting during a bulk download of files by a digital platform. Persons skilled in the art will appreciate that the present invention can be practiced by other than the described embodiments, which are presented for purposes of illustration rather than of limitation. The present invention is limited only by the claims that follow.

What is claimed is:

1. A method for dynamic file formatting during a bulk download of files, said method interacting with a digital platform of an organization, the method comprising:

receiving requests on the digital platform of the organization, said digital platform operating on a server of the digital platform, said requests made on a user portal of the digital platform by an entitled user who is logged onto the digital platform using a computing device, said requests comprising:

a first request, said first request comprises a request for a bulk download of files, where each file comprises one or more documents and each document comprises one to two hundred pages, said bulk download comprises fifty or more files;

a second request, said second request comprising:

a request for a change in a name of a file for twenty-five percent or more of files in the bulk download, where each file has a file name; and a request to change one or more pieces of information within a file for twenty-five or more percent of files in the bulk download;

a third request, said third request comprises a request to automatically perform the first request and the second request at a predetermined interval and a predetermined frequency, said predetermined interval comprises one day to one year, and said predetermined frequency comprises three times or more;

completing, automatically, the first request and the second request at the predetermined interval and the predetermined frequency; and providing, automatically, a completed first request and a completed second request at the predetermined interval and the predetermined frequency to the user portal;

wherein:

the digital platform comprises a software system that allows users including the entitled user to perform operations online; and the method for dynamic file formatting comprises changing a name of a file and changing one or more pieces of information within a file.

2. The method of claim 1 wherein the one or more documents comprise a word processing document, a spreadsheet, an image file format, a presentation program, or a portable document format.

3. The method of claim 1 wherein the third request comprises automatically performing the first request and the second request at the predetermined interval, said predetermined interval comprising one week to three months, and at the predetermined frequency, said predetermined frequency comprising six times or more.

4. The method of claim 1 wherein the fifty or more files in the bulk download are provided to the user portal on the digital platform using an application programming interface ("API") push.

5. The method of claim 1 further comprises:

receiving a fourth request made on the user portal of the digital platform by the entitled user, said fourth request comprises a request to provide the bulk download to a user portal of a non-entitled user, where said non-entitled user is not entitled to receive the bulk download when initiating a request for the bulk download.

6. The method of claim 1 wherein the bulk download comprises two hundred or more files.

7. The method of claim 1 wherein the second request comprises:

a request for a change in a name of fifty percent or more of files in the bulk download; and a request to change one or more pieces of information within a file for fifty percent or more of files in the bulk download.

8. A method for dynamic file formatting during a bulk download of files, said method interacting with a digital platform of an organization, the method comprising:

receiving requests on the digital platform of the organization, said digital platform operating on a server of the digital platform, said requests made on a user portal of the digital platform by an entitled user who is logged onto the digital platform using a computing device, said requests comprising:

a first request, said first request comprises a request for a bulk download of files, where each file comprises one or more documents and each document comprises one to two hundred pages, said bulk download comprises fifty or more files;

a second request, said second request comprising:

a request for a change in a name of a file for twenty-five percent or more of files in the bulk download, where each file has a file name; and a request to change one or more pieces of information within a file for twenty-five percent or more of files in the bulk download;

a third request, said third request comprising a request to provide the bulk download with results from the second request to a user portal of a non-entitled user, where said non-entitled user is not entitled to receive the bulk download when initiating a request for the bulk download;

completing the first request, the second request, and the third request; and providing a completed first request, a completed second request, and a completed third request to a user portal of the non-entitled user using an application programming interface ("API") push;

wherein:

the digital platform comprises a software system that allows users including the entitled user and the non-entitled user to perform operations online; and the method for dynamic file formatting comprises changing a name of a file and changing one or more pieces of information within a file.

9. The method of claim 8 wherein the one or more documents comprise a word processing document, a spreadsheet, an image file format, a presentation program, or a portable document format.

10. The method of claim 8 further comprising a fourth request, said fourth request comprising a request to automatically perform the first request, the second request, and the third request at a predetermined interval and predetermined frequency, said predetermined interval comprises one week to three months, and said predetermined frequency comprising six times or more.

11. The method of claim 8 wherein the bulk download comprises two hundred or more files.

12. The method of claim 8 wherein the second request comprises:

a request for a change in a name of fifty percent or more of files in the bulk download; and a request to change one or more pieces of information within a file for fifty percent or more of files in the bulk download.

13. The method of claim 8 wherein the second request comprises:

a request for a change in a name of all the files in the bulk download; and a request to change one or more pieces of information within a file for all the files in the bulk download.

* * * * *